US007995507B2

(12) United States Patent
Singh et al.

(10) Patent No.: US 7,995,507 B2
(45) Date of Patent: Aug. 9, 2011

(54) SYSTEM AND METHOD FOR WIRELESS COMMUNICATION OF UNCOMPRESSED VIDEO HAVING POWER SAVING CAPABILITY

(75) Inventors: Harkirat Singh, Santa Clara, CA (US); Xiangping Qin, San Jose, CA (US); Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 729 days.

(21) Appl. No.: 11/868,364

(22) Filed: Oct. 5, 2007

(65) Prior Publication Data

US 2008/0130540 A1      Jun. 5, 2008

Related U.S. Application Data

(60) Provisional application No. 60/872,936, filed on Dec. 4, 2006.

(51) Int. Cl.
*H04W 72/12* (2009.01)
(52) U.S. Cl. .................. 370/311; 370/336; 370/338
(58) Field of Classification Search ................ None
See application file for complete search history.

(56) References Cited

U.S. PATENT DOCUMENTS

| | | | |
|---|---|---|---|
| 6,774,926 B1 | 8/2004 | Ellis et al. | |
| 6,829,493 B1 | 12/2004 | Hunzinger | |
| 6,871,078 B2 | 3/2005 | Nishioka et al. | |
| 6,981,045 B1 | 12/2005 | Brooks | |
| 2004/0072573 A1 | 4/2004 | Shvodian | |
| 2004/0141490 A1 | 7/2004 | Hong | |
| 2004/0253996 A1* | 12/2004 | Chen et al. | ................ 455/574 |

(Continued)

FOREIGN PATENT DOCUMENTS

EP            1473870 A2      11/2004

(Continued)

OTHER PUBLICATIONS

FreshNews.com, SiBEAM Receives Equity Investment from Best Buy, http://freshnews.com/print/node/261440, Jan. 4, 2010, 2 pages.

(Continued)

*Primary Examiner* — Min Jung
(74) *Attorney, Agent, or Firm* — Kenneth L. Sherman, Esq.; Michael Zarrabian, Esq.; Myers Andras Sherman & Zarrabian LLP

(57) ABSTRACT

A method of efficient scheduling for portable devices communicating with a coordinator over a network is disclosed. The method includes: listening for beacons broadcasted by a coordinator; assigning, by the coordinator, a single contiguous time block (CTB) for portable devices during a superframe defined by consecutive beacons; scheduling a single wake period of one of the portable devices, which overlaps inclusively with consecutive beacons and the single CTB; and minimizing duration of the single wake period of the portable device. The single CTB may be arranged next to one of the consecutive beacons. The method may further comprise assigning, by the coordinator, a single random access time block (RATB) for the one of the portable devices so as to overlap with the single wake period. The RATB may be arranged next to one of consecutive beacons. The CTB may be arranged next to the RATB. The CTB may be arranged next to one of the consecutive beacons.

28 Claims, 7 Drawing Sheets

U.S. PATENT DOCUMENTS

| | | | |
|---|---|---|---|
| 2005/0009578 A1* | 1/2005 | Liu | 455/574 |
| 2005/0233789 A1* | 10/2005 | Maekawa | 463/1 |
| 2005/0249137 A1* | 11/2005 | Todd et al. | 370/311 |
| 2006/0129855 A1 | 6/2006 | Rhoten et al. | |
| 2006/0270438 A1 | 11/2006 | Choi | |
| 2007/0060152 A1 | 3/2007 | Sakamoto et al. | |
| 2007/0237122 A1* | 10/2007 | Liu et al. | 370/338 |
| 2007/0297438 A1* | 12/2007 | Meylan et al. | 370/445 |
| 2008/0130543 A1 | 6/2008 | Singh et al. | |
| 2008/0134271 A1 | 6/2008 | Qin et al. | |
| 2009/0279464 A1* | 11/2009 | Kakani et al. | 370/311 |

FOREIGN PATENT DOCUMENTS

| | | |
|---|---|---|
| EP | 1597895 A2 | 11/2005 |
| JP | 2004320769 A | 11/2004 |
| KR | 1020060057515 | 6/2008 |
| WO | WO 2006/083559 A1 | 9/2005 |
| WO | WO 2006/101801 | 9/2006 |

OTHER PUBLICATIONS

Hachman, "CE Giants back Amimon's Wireless HDTV Tech," online: www.pcmag.com, 1 page, Jul. 23, 2008.

IEEE 802.15.3 Working Group. Part 15.3: Wireless medium access control (MAC) and physical layer (PHY) specifications for high rate wireless personal area networks (WPANs). IEEE Draft Standard, Draft P802.15.3/D16, Sep. 2003, pp. 1-324.

IEEE Wireless LAN Edition (2003), A compilation based on IEEE Std 802.11TM—1999 (R2003) Amendment 4: Further Higher Data Rate Extension in the 2.4 GHz Band, pp. 1-77.

Jeong et al., Performance of Adaptive Sleep Period Control for Wireless Communications Systems. IEEE Transactions on Wireless Communications, Nov. 2006, 5(11): 3012-3016.

LG Electronics Inc., WirelessHD Specification Version 1.0 Overview, Oct. 9, 2007, 77 pages.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).

International Preliminary Report on Patentability and Written Opinion dated Jun. 10, 2009 for PCT/KR2007/006222, filed Dec. 4, 2007.

International Search Report dated Mar. 11, 2008 for PCT/KR2007/006223, filed Dec. 4, 2007.

International Preliminary Report on Patentability dated Jun. 10, 2009 for PCT/KR2007/006223, filed Dec. 4, 2007.

International Search Report dated Mar. 17, 2008 for PCT/KR2007/006227, filed Dec. 4, 2006.

International Preliminary Report on Patentability and Written Opinion dated Jun. 10, 2009 for PCT/KR2007/006227, filed Dec. 4, 2007.

Jung Hyon Jun et al., "Afinity-Based Power Saving MAC Protocol in Ad Hoc Networks", In: Proceeding of the $3^{rd}$ IEEE Int'l Conf. on Pervasive Computing and Communication : IEEE, 2005, pp. 363-372.

International Search Report dated Mar. 14, 2008 for PCT/KR2007/006222.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

U.S. Office Action dated Jun. 28, 2010 in U.S. Appl. No. 11/947,694, filed Nov. 29, 2007.

* cited by examiner

SYSTEM AND METHOD FOR WIRELESS COMMUNICATION OF UNCOMPRESSED VIDEO HAVING POWER SAVING CAPABILITY

RELATED APPLICATION

This application claims priority from U.S. Provisional Patent Application No. 60/872,936, filed on Dec. 4, 2006, which is incorporated herein by reference.

BACKGROUND OF THE INVENTION

1. Field of the Invention

The invention relates to power saving mechanisms in wireless networks, and in particular, to power saving mechanism over a wireless network using energy efficient scheduling for portable devices.

2. Brief Description of the Related Technology

A wireless network may comprise a plurality of battery operated handheld devices including a mobile phone, an MP3 player, a personal multimedia player (PMP), a camcorder, a personal digital assistant (PDA), etc. In such a battery operated handheld device, it is paramount to conserve power. In ad hoc mode operations as shown in FIG. 3, an MP3 player is downloading audio/video (AV) data from a hard disk and a mobile phone is uploading data (pictures) onto a PMP.

The IEEE 802.15.3 standard provides techniques for extending the operation time of battery powered electronic devices that communicate over a wireless network. The standard provides three major techniques to enable the battery powered device to turn off for one or more time periods: device synchronized power save (DSPS) mode, piconet-synchronized power save (PSPS) mode, and asynchronous power save (APS) mode. In the piconet, which is a wireless ad hoc data communication system that allows a plurality of data devices to communicate with each other, the devices operate in one of four power management (PM) modes: ACTIVE mode, DSPS mode, PSPS mode, or APS mode.

PSPS mode allows the devices to sleep at intervals defined by a piconet coordinator. The device sends a request to the piconet coordinator. The piconet coordinator then selects beacons that will be the system wake beacons and indicates that the device will be set to PSPS mode. All the devices in PSPS mode are required to listen for the system wake beacons.

DSPS mode is designed to enable groups of devices to sleep for multiple superframes but still be able to wake up during the same superframe. The devices synchronize their sleep patterns by joining a DSPS set which specifies the interval between wake periods for the devices and the next time the devices will be awake. Besides allowing the devices to wake up and exchange traffic at the same time, the use of DSPS sets makes it easy for other devices in the piconet to determine exactly when a DSPS device will be available to receive traffic.

APS mode allows a device to conserve power for extended periods until the device chooses to listen for a beacon. The only responsibility of a device in APS mode is to communicate with the piconet coordinator before the end of its association timeout period (ATP) in order to preserve its membership in the piconet.

The piconet coordinator allocates asynchronous channel time allocations (CTAs) to a destination device that is in either PSPS mode or DSPS mode in the wake superframes for that device.

Regardless of the device's power management mode, every device in the piconet is allowed to power down during parts of the superframe when the device is not scheduled to transmit or receive data.

Thus, techniques exist today that allows electronic devices that access a wireless communication network to conserve as much battery power as possible.

SUMMARY OF CERTAIN INVENTIVE ASPECTS

One aspect of the invention provides a method of efficient scheduling for portable devices communicating with a coordinator over a network. The method includes: listening for a series of scheduled beacons broadcasted by a coordinator; assigning, by the coordinator, a single contiguous time block (CTB) for a plurality of portable devices during a superframe defined by first and second consecutive beacons; scheduling a single wake period of one of the plurality of portable devices, which overlaps inclusively with one of the first and second consecutive beacons and the single CTB; and minimizing duration of the single wake period of the one of the plurality of portable devices.

The single CTB may be arranged immediately next to one of the first and second consecutive beacons.

The method may further include assigning, to the coordinator, a single random access time block (RATB) for the one of the plurality of portable devices so as to overlap with the single wake period. The RATB may be arranged immediately next to one of the first and second consecutive beacons. The single CTB may be arranged immediately next to the RATB. In other embodiment, the single CTB may be arranged immediately next to the one of the first and second consecutive beacons.

Another aspect of the invention provides a system for efficient scheduling for portable devices communicating with a coordinator over a network. The system includes: a coordinator configured to broadcast a series of scheduled wake beacons and to assign a single contiguous time block (CTB) and a random access time block (RATB) for a superframe defined by first and second consecutive beacons, and a portable device configured to listen for the series of scheduled wake beacons from the coordinator, wake up during a wake period for the superframe, and communicate with the coordinator. The wake period of the portable device overlaps with one of the first and second consecutive beacons, the single CTB, and the RATB, and wherein duration of the single wake period of the portable device is minimized.

The coordinator may assign a single random access time block (RATB) for the one of the plurality of portable devices so as to overlap with the single wake period, wherein the coordinator arranges the single CTB immediately next to one of the first and second consecutive beacons, and wherein the coordinator arranges the RATB immediately next to one of the first and second consecutive beacons. Alternatively, the coordinator may arrange the single CTB immediately next to the RATB. The coordinator may arrange the single CTB immediately next to the one of the first and second consecutive beacons.

Still another aspect of the invention provides a system for efficient scheduling for portable devices communicating with a coordinator over a network. The system includes: means for listening for a series of scheduled beacons broadcasted by a coordinator; means for assigning, by the coordinator, a single contiguous time block (CTB) for a plurality of portable devices during a superframe defined by first and second consecutive beacons; means for scheduling a single wake period of one of the plurality of portable devices, which overlaps inclusively with one of the first and second consecutive beacons and the single CTB; and means for minimizing duration of the single wake period of the one of the plurality of portable devices.

The coordinator may assign a single random access time block (RATB) for the one of the plurality of portable devices so as to overlap with the single wake period, wherein the single CTB is arranged immediately next to one of the first and second consecutive beacons, and wherein the RATB is arranged immediately next to one of the first and second consecutive beacons. The single CTB may be arranged immediately next to the RATB. The single CTB may be arranged immediately next to the one of the first and second consecutive beacons. The single CTB of the portable device may be provided across two consecutive superframes. A duration of the continuous awake period may be substantially longer than sum of durations of the RATB, the CTB, and one beacon.

Still another aspect of the invention provides a method of efficient scheduling for portable devices communicating with a coordinator over a network. The method includes: assigning, by the coordinator, a single contiguous time block (CTB) for a plurality of portable devices during a superframe defined by first and second consecutive beacons, and assigning next to the CTB, by the coordinator, a single random access time block (RATB) for the one of the plurality of portable devices. At least one of the single CTB and the single RATB may be arranged immediately next to one of the first and second consecutive beacons.

Still another aspect of the invention provides a method of efficient scheduling for portable devices communicating with a coordinator over a network. The method includes: listening for a series of scheduled beacons broadcasted by a coordinator; scheduling a single wake period of one of the plurality of portable devices, which overlaps inclusively with one of the first and second consecutive beacons and a single contiguous time block (CTB); and minimizing duration of the single wake period of the one of the plurality of portable devices.

The method may further include scheduling the single wake period of one of the plurality of portable devices, which overlaps inclusively with a single random access time block (RATB) assigned for the one of the plurality of portable devices so as to overlap with the single wake period. The single RATB may be exclusively assigned for contention of the plurality of portable device such that alternating current (AC) powered devices are prohibited from participating in the contention in the single RATB.

DETAILED DESCRIPTION OF CERTAIN INVENTIVE EMBODIMENTS

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Overview of Communication System

Certain embodiments provide a method and system for transmission of uncompressed HD video information from a transmitter to a receiver over wireless channels.

Figure 1:
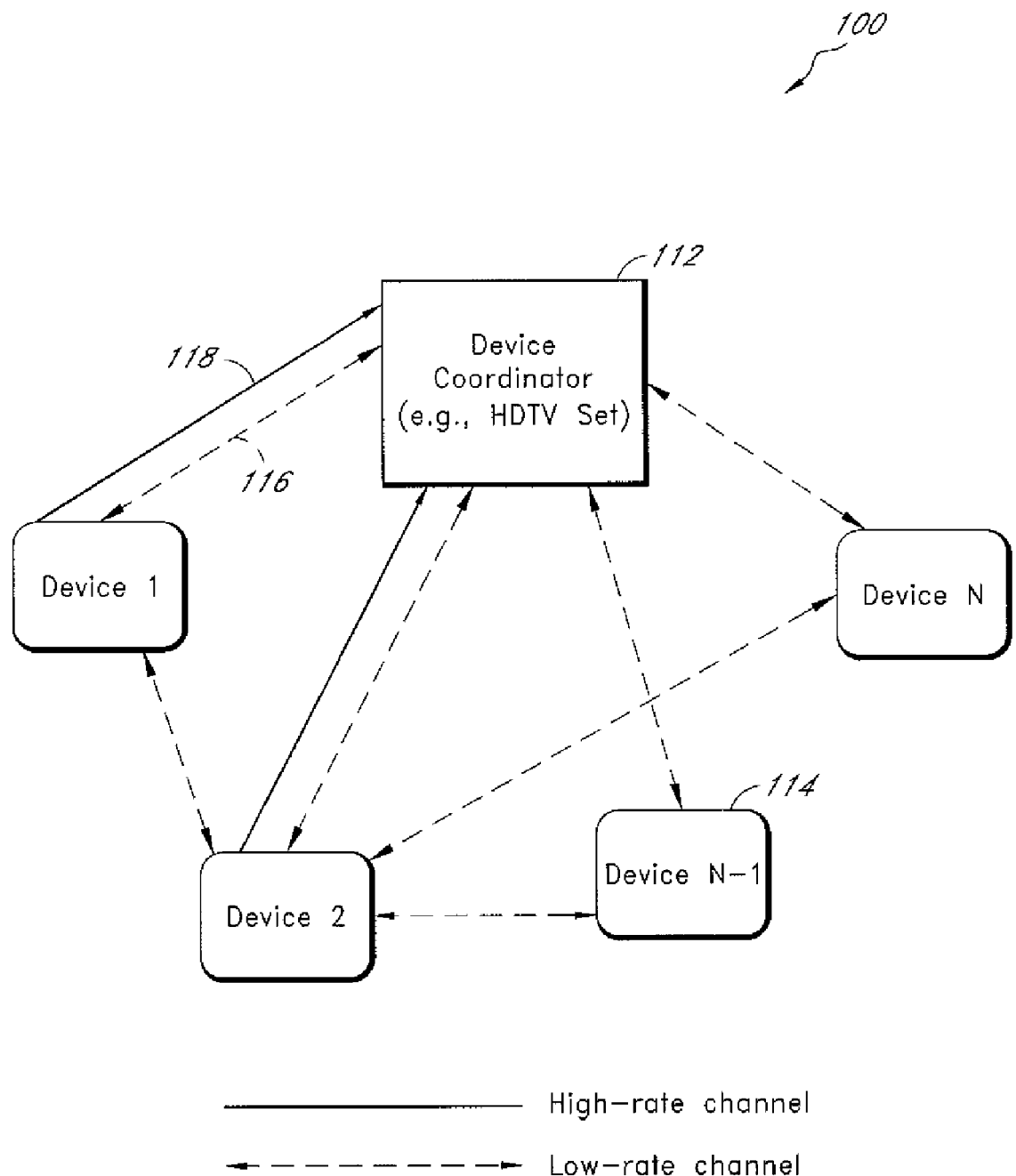
FIG. 1 is a functional block diagram of a wireless network that implements uncompressed HD video transmission between wireless devices according to one embodiment of the system and method.

A wireless video area network (WVAN) consists of one coordinator and one or more stations as shown in FIG. 1. The Coordinator is normally, but not always, a device that is a sink for audio or video data, e.g., a display, but also potentially a media storage device like a personal video recorder (PVR). A station, on the other hand, is a device that has media that it can either source or sink, potentially at the same time with the time division duplex (TDD) scheme.

The computing and networking industry uses the Open Systems Interconnection Reference Model (OSI model) for communications and computer network protocol design. The OSI model is a hierarchical structure of seven layers that defines the requirements for communications between two devices. The seven layers include application layer, presentation layer, session layer, transport layer, network layer, data link layer, physical layer.

Of particular relevance here are the data link and physical layers. The data link layer provides the functional and procedural means to transfer data between network entities and to detect and possibly correct errors that may occur in the physical layer. The data link layer is divided into two sublayers: the Media Access Control (MAC) layer and the Logical Link Control (LLC) layer. The MAC sublayer controls how a computer on the network gains access to the data and permission to transmit it. The LLC layer controls frame synchronization, flow control and error checking. The physical (PHY) layer defines all the electrical and physical specifications for devices.

The high-rate PHY (HRP) is a PHY that supports multi-Gb/s throughput at distance of 10 m through adaptive antenna technology. Because of this, the HRP is highly directional and can only be used for unicast connections as shown in FIG. 1. The HRP is optimized for the delivery of uncompressed high-definition video, and other data can be communicated using the HRP. To support multiple video resolutions, the HRP has more than one data rate defined. The HRP carries isochronous data such as audio and video, asynchronous data, MAC commands, antenna steering information, and higher layer control data for A/V devices.

The low-rate PHY (LRP) is a multi-Mb/s bidirectional link that also provides a range of 10 m. Multiple data rates are defined for the LRP, with the lower data rates having near omni-directional coverage while the highest data rates are directional as shown in FIG. 1. Because the LRP has near omni-directional modes, it can be used for both unicast and broadcast connections. Furthermore, because all stations support the LRP, it can be used for station-to-station links. The LRP supports multiple data rates, including directional modes, and is used to carry low-rate isochronous data such as audio, low-rate asynchronous data, MAC commands including the beacon frame, acknowledgements for HRP packets, antenna steering information, capabilities information, and higher layer control data for A/V devices.

The HRP and LRP operate in overlapping frequency bands and so they are coordinated in a TDMA (time division multiple access) manner by the MAC. The WVAN supports at least one uncompressed 1080p video stream with associated audio at a time. Multiple lower rate uncompressed video streams, e.g., two 1080i video streams, are also supported.

The WVAN supports two types of devices, coordinator and station. The coordinator controls the timing in the WVAN, keeps track of the members of the WVAN, transmits or receives data using the LRP or using the HRP. The station transmits and receives data using the LRP, initiates stream connections, and transmits or receives data using the HRP. The station may be capable of acting as a coordinator in the WVAN. Such a station is referred to as being coordinator capable.

In addition to the two MAC personalities of coordinator and station, each device in the WVAN will have one of four different PHY capabilities; HR0, HRRX, HRTX, and HRTR. HR0 is a device that is not able to either receive or transmit using the HRP. HRRX is a device that is able to receive in the HRP, but is not able to transmit using the HRP. HRTX is a device that is able to transmit in the HRP, but is not able to receive using the HRP. HRTR is a device that is able to both transmit and receive using the HRP.

All compliant devices are able to transmit and receive using the LRP. Both the HRP and LRP may provide multiple data rates.

Detailed Operation of the Communication Systems

Some embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a transmitter of the video information (hereinafter "transmitter 114"). For example, the receiver 112 can be a sink of video and/or audio data implemented, such as, in an HDTV set in a home wireless network environment which is a type of WLAN. The transmitter 114 can be a source of uncompressed video or audio. Examples of the transmitter 114 include a set-top box, a DVD player or recorder, digital camera, camcorder, and so forth.

Figure 2:
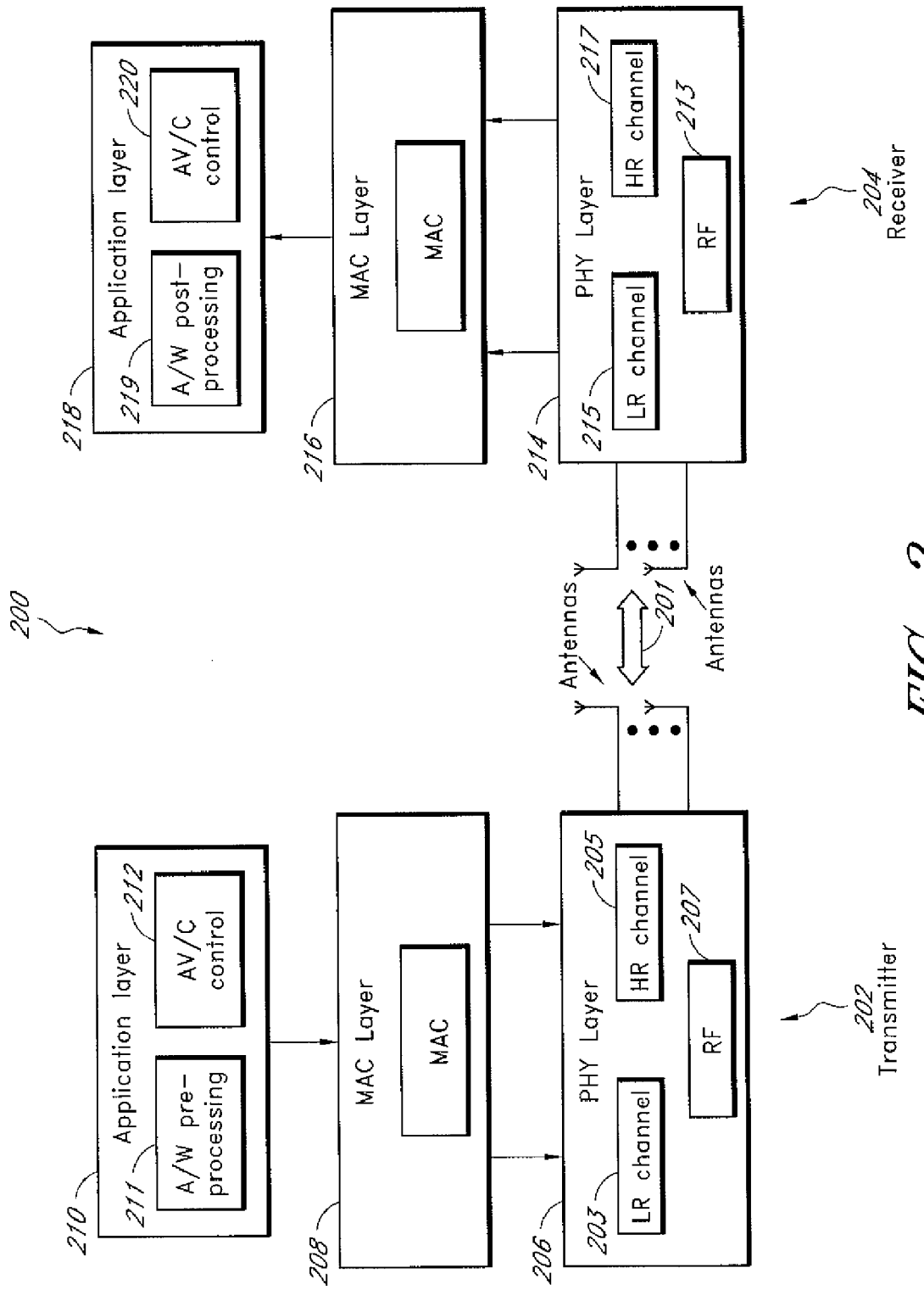
FIG. 2 is a functional block diagram of an exemplary communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection ended, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an AN post-processing module 219 and an AV/C module 220. The module 219 can perform an inverse of the processing method of the module 211 to regenerate the uncompressed video, for example. The AV/C module 220 operates in a complementary way with the AV/C module 212 of the transmitter 202.

Figure 3:
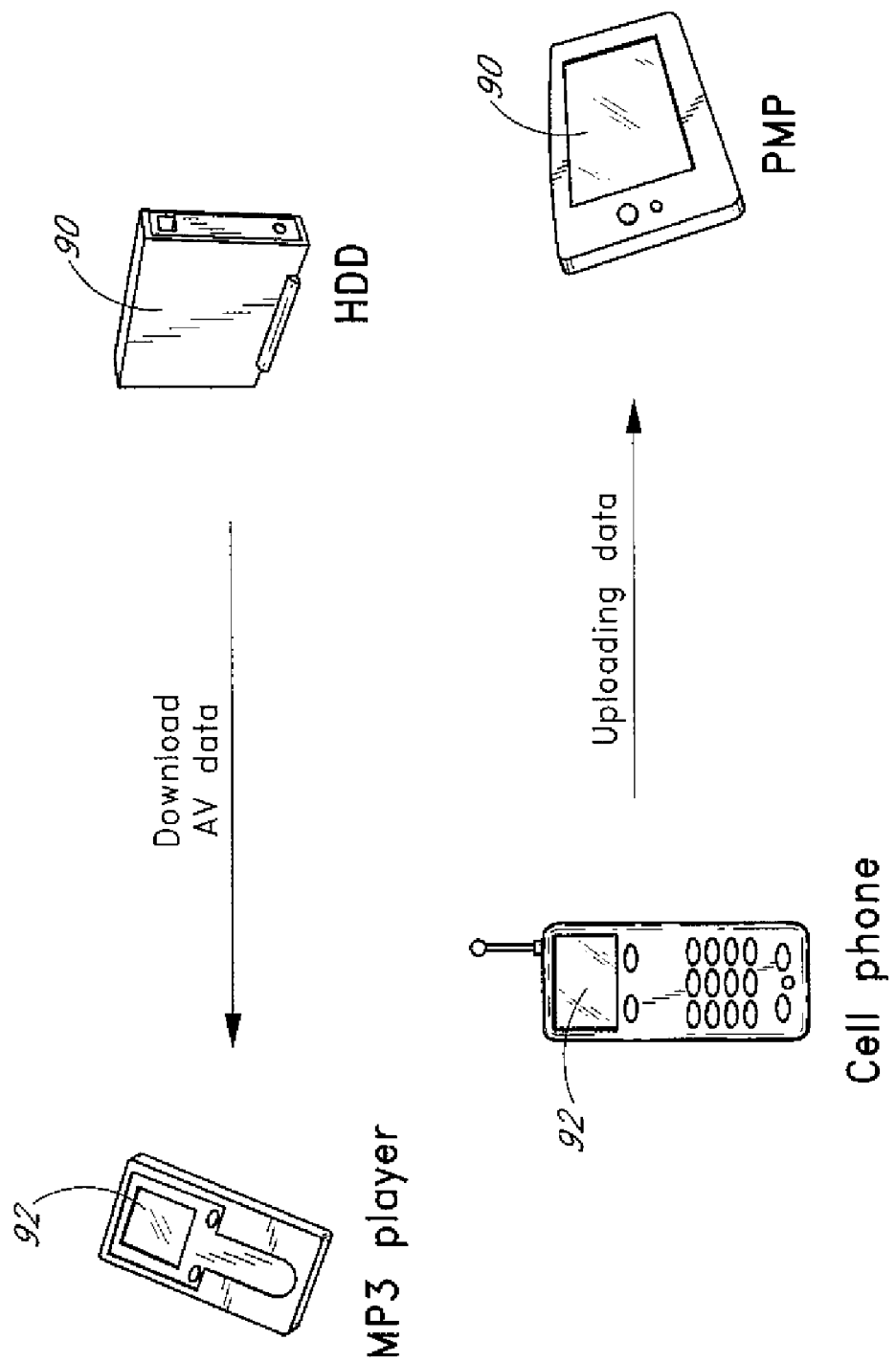
FIG. 3 is a diagram illustrating ad hoc operation of portable devices.

FIG. 3 is a diagram illustrating ad hoc operation of portable devices, which shows operations that might take place in a wireless network. The wireless network comprises a piconet, which is a wireless ad hoc data communication system that allows a plurality of data devices to communicate with each other, As shown in FIG. 3, the wireless network comprises a coordinator 90 and a plurality of portable devices 92. One of the devices 92 may assume the role of the coordinator 90. The portable devices 92 may include a mobile phone, an MP3 player, a personal multimedia player (PMP), a camcorder, and a personal digital assistant (PDA).

In order to enable long operation time for a battery powered portable device, it is important to enable the battery powered portable device to turn off completely or reduce power for long periods of time relative to a superframe duration.

Figure 4:
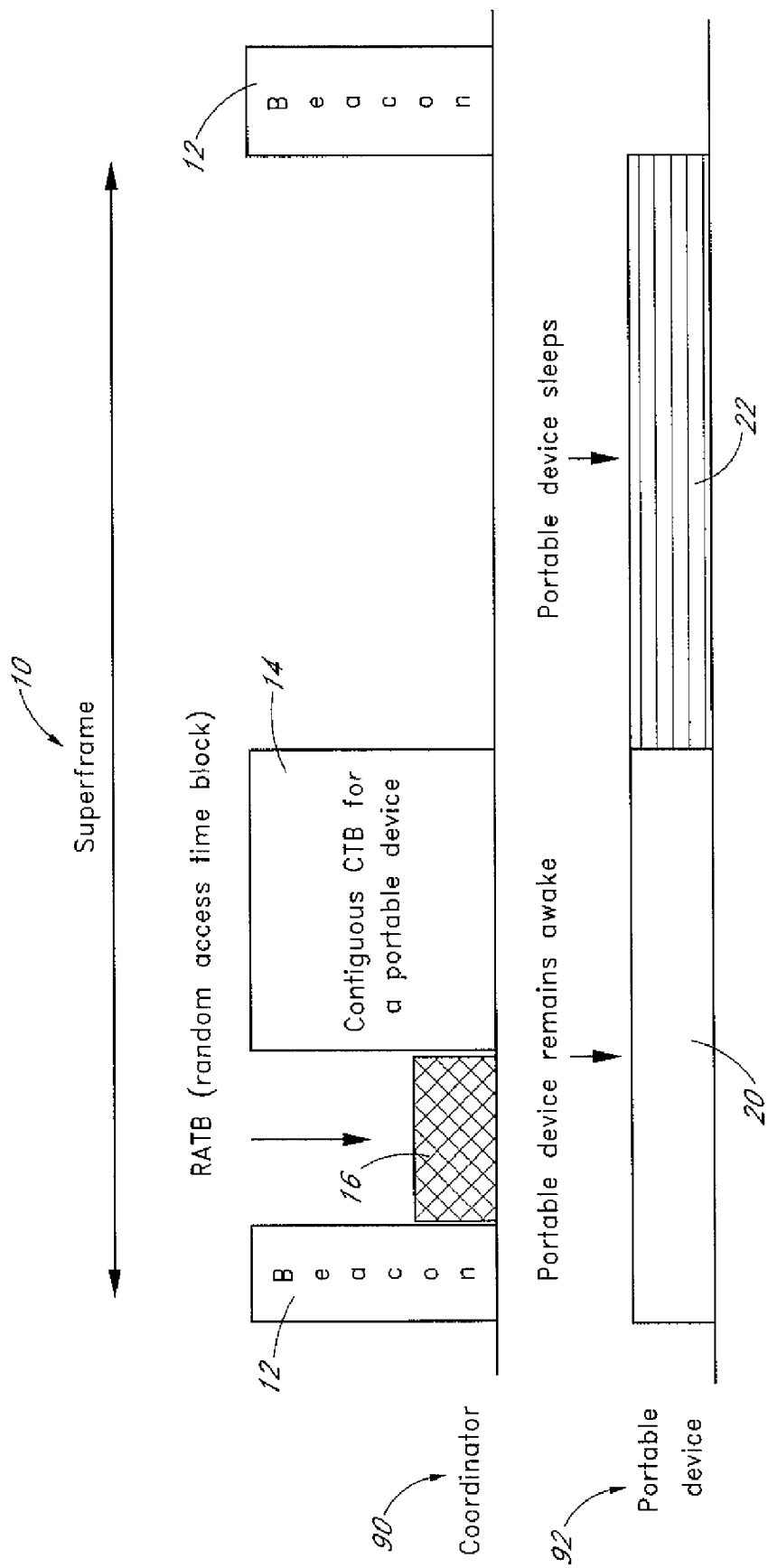
FIG. 4 is a diagram illustrating a superframe according to an embodiment of the invention.
Figure 5:
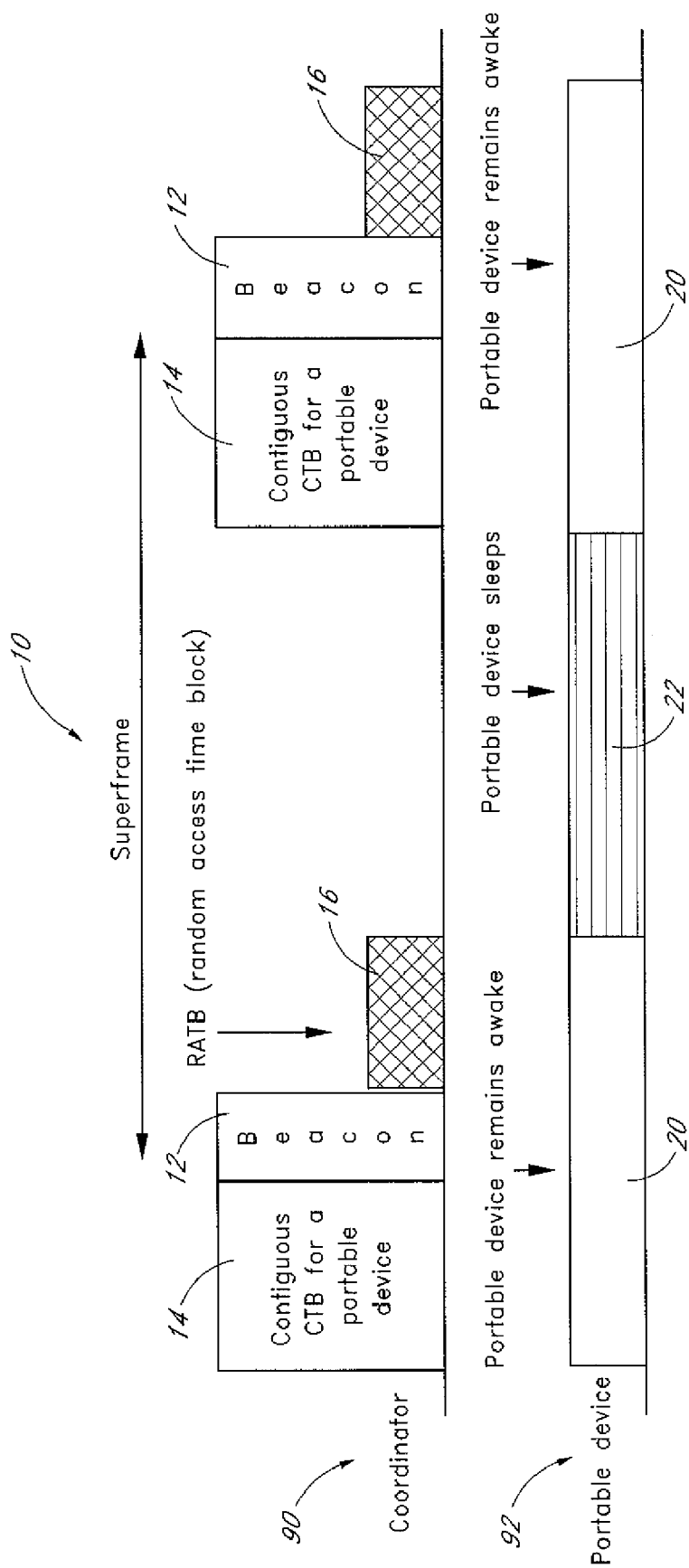
FIG. 5 is a diagram illustrating another superframe according to another embodiment of the invention.
Figure 6:
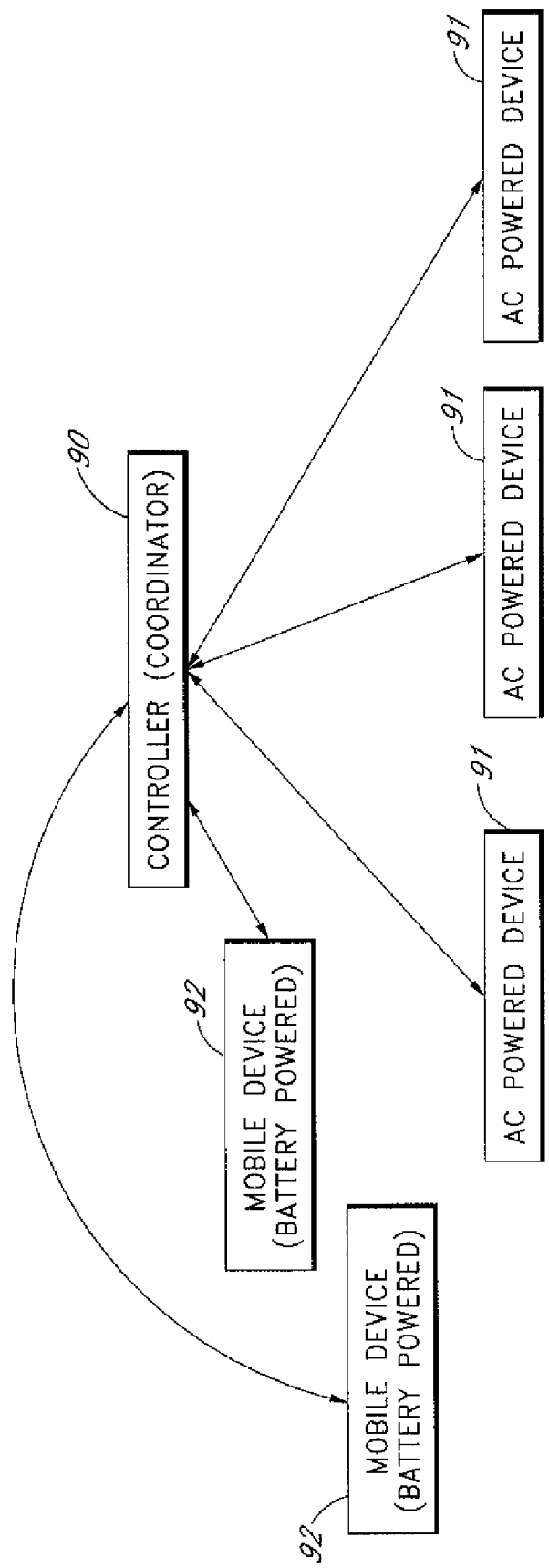
FIG. 6 is a block diagram illustrating a wireless network.

FIG. 4 is a diagram illustrating a superframe according to an embodiment of the invention, and FIG. 5 is a diagram illustrating another superframe according to another embodiment of the invention. FIG. 6 shows a wireless network. The wireless network may further comprise a plurality of AC-powered devices.

A superframe 10 is a basic time division of the wireless network, which comprises a beacon 12, a channel time allocation period or a contiguous time block 14, and a contention access period or a random access time block 16 as shown in FIG. 4 and FIG. 5.

The coordinator 90 transmits the beacons 12 and assigns the contiguous time blocks 14 and the random access time block 16. The portable device 92 responds to and communicates with the coordinator 90. More specifically, the portable devices 92 wakes up to listen for the wake beacon 12 scheduled by the coordinator 90. When there are more than one portable device 92, the coordinator 90 assigns the contiguous time blocks 14 for the portable devices 92.

Since multiple sleep and wake transitions consume power, the coordinator 90 allocates the contiguous time blocks 14 for the portable devices 92 as shown in FIGS. 4 and 5.

Referring again to FIG. 4, the portable device 92 has two types of period including a wake period 20 and a sleep period 22. The wake period 20 of the portable device 92 substantially overlaps with the durations of the beacon 12, the random access time block 16, and the contiguous time block 14. Therefore, during the wake period 20, the portable device 92 can listen to the beacon and use the assigned contiguous time block 14 or the random access time block 16 for communicating with the coordinator 90 and the other portable devices 92.

Figure 7:
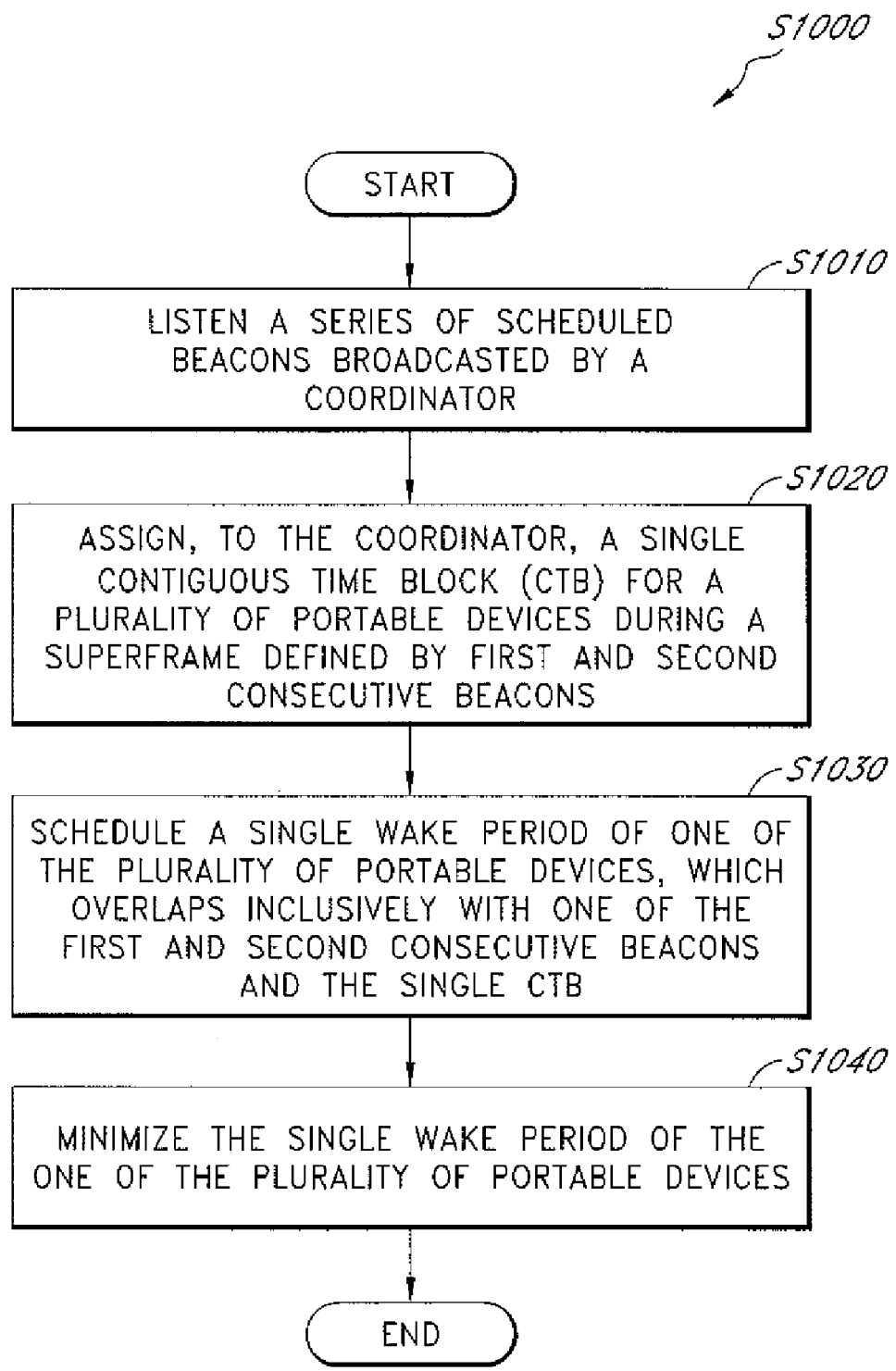
FIG. 7 is a flowchart showing a method of efficient scheduling for portable devices communicating with a coordinator over networks.

Referring to FIG. 7, a method of efficient scheduling for portable devices communicating with a coordinator over networks comprises: listening for a series of scheduled beacons broadcasted by a coordinator (S1010); assigning, by the coordinator, a single contiguous time block (CTB) for a plurality of portable devices during a superframe defined by first and second consecutive beacons (S1020); scheduling a single wake period of one of the plurality of portable devices, which overlaps inclusively with one of the first and second consecutive beacons and the single CTB (S1030); and minimizing duration of the single wake period of the one of the plurality of portable devices (S1040). In certain embodiments, minimizing the duration of the single wake period is achieved by setting the duration of the single wake period to be substantially same as sum of durations of the beacon and the single CTP since multiple sleep and wake transitions and a long wake period cause to consume more power in mobile devices.

In addition, the method shown in FIG. 7 can be applied for an efficient scheduling for a single portable device communicating with a coordinator over networks. The method comprises: listening for a series of scheduled beacons broadcasted by a coordinator; assigning, by the coordinator, a single contiguous time block (CTB) for a portable device during a superframe defined by first and second consecutive beacons; scheduling a single wake period of the portable device, which overlaps inclusively with one of the first and second consecutive beacons and the single CTB; and minimizing duration of the single wake period of the portable device.

There may be many ways to schedule the wake period 20 of the portable device 92 for power saving. As shown in FIGS. 4 and 5, the contiguous time block 14 may come before or after the beacon 12. No matter where the contiguous time block 14 occurs, the durations for the beacon 12, the random access time block 16, and the contiguous time block 14 are provided consecutively so as to correspond to a single block of the contiguous time block 12.

The battery powered portable devices 92 can have long operation time by scheduling the wake period 20 and the sleep period 22 to minimize the sleep and wake transitions.

CONCLUSION

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of scheduling for portable devices communicating with a coordinator over a network, the method comprising:
   listening for a series of scheduled beacons broadcasted by a coordinator;
   assigning, by the coordinator, at least one contiguous time block (CTB) including a CTB for a portable device during a superframe defined by first and second consecutive beacons; and
   scheduling a single wake period of the portable device, that overlaps with one of the first and second consecutive beacons and the single CTB, wherein the single wake period of the portable device is minimized.

2. The method of claim 1, wherein the CTB for the portable device is arranged immediately next to one of the first and second consecutive beacons.

3. The method of claim 1, further comprising assigning a single random access time block (RATB) so as to overlap with the single wake period.

4. The method of claim 3, wherein the RATB is arranged immediately next to one of the first and second consecutive beacons.

5. The method of claim 4, wherein the CTB for the portable device is arranged immediately next to the RATB.

6. The method of claim 4, wherein the CTB for the portable device is arranged immediately next to the one of the first and second consecutive beacons.

7. The method of claim 1, wherein the portable device listens to at least one of the series of scheduled beacons and uses the assigned CTB or an assigned random access time block (RATB) for communicating with the coordinator or other portable devices in the network.

8. The method of claim 1, wherein the single wake period is minimized based on setting a duration of the single wake period to a sum of durations of the first and second consecutive beacons and the single CTB.

9. A system for scheduling for portable devices communicating with a coordinator over a network, the system comprising:
   a coordinator configured to broadcast a series of beacons and to assign at least one contiguous time block (CTB) and a random access time block (RATB) for a superframe defined by first and second consecutive beacons, and a portable device configured to listen for the series of beacons from the coordinator, wake up during a wake period for the superframe, and communicate with the coordinator, wherein the wake period of the portable device overlaps with the following: one of the first and second consecutive beacons, a CTB for the portable device, and the RATB, and wherein the single wake period of the portable device is minimized.

10. The system of claim 9, wherein the coordinator assigns a single random access time block (RATB) so as to overlap with the single wake period, wherein the coordinator arranges the CTB for the portable device immediately next to one of the first and second consecutive beacons, and wherein the coordinator arranges the RATB immediately next to one of the first and second consecutive beacons.

11. The system of claim 10, wherein the coordinator arranges the CTB for the portable device immediately next to the RATB.

12. The system of claim 10, wherein the coordinator arranges the CTB for the portable device immediately next to the one of the first and second consecutive beacons.

13. A system for scheduling for portable devices communicating with a coordinator over a network, the system comprising:
means for listening for a series of scheduled beacons broadcasted by a coordinator;
means for assigning, by the coordinator, at least one contiguous time block (CTB) including a CTB for a portable device during a superframe defined by first and second consecutive beacons;
means for scheduling a single wake period of the portable device that overlaps with one of the first and second consecutive beacons and the single CTB, wherein the single wake period of the portable device is minimized.

14. The system of claim 13, wherein the coordinator assigns a random access time block (RATB) so as to overlap with the single wake period, wherein the CTB for the portable device is arranged immediately next to one of the first and second consecutive beacons, and wherein the RATB is arranged immediately next to one of the first and second consecutive beacons.

15. The system of claim 14, wherein the CTB for the portable device is arranged immediately next to the RATB.

16. The system of claim 14, wherein the CTB for the portable device is arranged immediately next to the one of the first and second consecutive beacons.

17. The system of claim 14, wherein the CTB for the portable device is provided across two consecutive superframes.

18. The system of claim 13, wherein a duration of the continuous awake period is substantially longer than sum of durations of the RATB, the CTB, and one beacon.

19. A method of scheduling for portable devices communicating with a coordinator over a network, the method comprising:
assigning, by the coordinator, a contiguous time block (CTB) for a portable device during a superframe defined by first and second consecutive beacons, and
assigning next to the CTB, by the coordinator, a single random access time block (RATB) for the network,
wherein at least one of the single CTB and the single RATB is arranged immediately next to one of the first and second consecutive beacons, wherein the plurality of devices includes at least one alternating current powered device and at least one battery powered portable device, and wherein the contention access period is assigned for contention of said battery powered portable devices, and excludes the alternating current powered devices.

20. A method of scheduling for portable devices communicating with a coordinator over a network, the method comprising:
listening for a series of scheduled beacons broadcasted by a coordinator;
scheduling a single wake period of one of the plurality of portable devices, which overlaps with one of the first and second consecutive beacons and a contiguous time block (CTB) for the one of the plurality of portable devices, wherein the single wake period of the one of the plurality of portable devices is minimized.

21. The method of claim 20, further comprising scheduling the wake period of the one of the plurality of portable devices to overlap inclusively with a random access time block (RATB) assigned for the network.

22. The method of claim 21, wherein the single RATB is exclusively assigned for contention of the plurality of portable device such that alternating current (AC) powered devices are prohibited from participating in the contention in the single RATB.

23. A method of scheduling communications for a plurality of devices over a network, the method comprising:
transmitting, during a beacon period of at least one of a plurality of superframes, at least one beacon to a plurality of devices including at least a first battery powered portable device;
allocating, during at least one of the plurality of superframes, a contention access period for at least a portion of the plurality of devices; and
allocating, during at least one of the plurality of superframes, at least one channel time allocation period, wherein each channel time allocation period is allocated to one of the devices, wherein the channel time allocation periods include at least a first channel time allocation period allocated to the first battery powered portable device, and wherein the beacon period, the contention access period, and the first channel time allocation period are consecutive in time, wherein the contention access period precedes the beacon period.

24. The method of claim 23, wherein the plurality of devices includes at least one alternating current powered device and wherein the contention access period is assigned for contention of battery powered portable devices to the exclusion of alternative current powered devices.

25. A method of scheduling communications at a battery powered portable device in a network, the method comprising:
receiving, at the battery powered portable device, during a beacon period of at least one of a plurality of superframes, at least one beacon from a coordinator to a plurality of devices including the battery powered portable device;
receiving, at the battery powered portable device, during at least one of the plurality of superframes and from the coordinator, an allocation of a contention access period for at least a portion of the plurality of devices;
receiving, at the battery powered portable device, during at least one of the plurality of superframes, at least one channel time allocation period for the battery powered portable device, wherein the beacon period, the contention access period, and the channel time allocation period for the device are consecutive in time;

scheduling a wake period substantially overlapping with the beacon period, the contention access period, and the channel time allocation period for the battery powered portable device; and scheduling a sleep period immediately before or after the wake period.

26. The method of claim 25, wherein the plurality of devices includes at least one alternating current powered device and wherein the contention access period is assigned for contention of battery powered portable devices to the exclusion of alternative current powered devices.

27. The method of claim 25, wherein the contention access period precedes the beacon period.

28. The method of claim 25, wherein transitions between the sleep period and the wake period are minimized.

* * * * *